United States Patent [19]
Chung

[11] Patent Number: 6,134,610
[45] Date of Patent: Oct. 17, 2000

[54] BUFFER ROOM LOGIC IN DATA STORAGE DEVICE AND METHOD FOR CONTROLLING THE SAME

[75] Inventor: Ji-Hwan Chung, Seoul, Rep. of Korea

[73] Assignee: SamSung Electronics Co., Ltd., Suwon, Rep. of Korea

[21] Appl. No.: 09/105,180

[22] Filed: Jun. 26, 1998

[30] Foreign Application Priority Data

Jun. 26, 1997 [KR] Rep. of Korea ....................... 97-27550

[51] Int. Cl.[7] ....................................... G06F 3/00
[52] U.S. Cl. ................. 710/55; 710/29; 710/52; 710/57; 710/59; 714/45; 714/48; 714/54
[58] Field of Search ................. 710/29, 52–55, 710/57, 59; 365/73, 189; 714/45, 48, 54

[56] References Cited

U.S. PATENT DOCUMENTS

| | | | |
|---|---|---|---|
| 5,084,841 | 1/1992 | Williams et al. | 365/189.07 |
| 5,249,271 | 9/1993 | Hopkinson et al. | 710/57 |
| 5,289,478 | 2/1994 | Barlow et al. | 714/770 |
| 5,305,253 | 4/1994 | Ward | 365/73 |
| 5,450,546 | 9/1995 | Krakirian | 710/57 |
| 5,455,954 | 10/1995 | Packer | 710/74 |
| 5,471,351 | 11/1995 | Ishiguro | 360/53 |
| 5,664,094 | 9/1997 | Taniwa et al. | 714/42 |
| 5,909,334 | 6/1999 | Barr et al. | 360/53 |
| 5,941,998 | 8/1999 | Tillson | 714/54 |

Primary Examiner—Thomas C. Lee
Assistant Examiner—Tammara Peyton
Attorney, Agent, or Firm—Robert E. Bushnell, Esq.

[57] ABSTRACT

A buffer room logic buffers data transferred between a host and a data storage device with a data write verification capability and stores data on a predetermined recording medium. The buffer room logic has first and second buffer counters, first and second comparators, first and second switches, and a controller. The first and second buffer counters count pulses generated at the end of a data transfer from a host interface and at the end of a data write. The first comparator compares the value of the first buffer counter with the value of a maximum buffer counter indicating a maximum size of a buffer memory, and outputs a pulse to the host interface so as to stop data transfer from the host if the comparison results in a host-no-room condition. The second comparator compares the value of the second buffer counter with the value of the maximum buffer counter, and outputs a pulse to a recording medium interface so as to stop transfer of data read from the recording medium if the comparison results in a disk-no-room condition. The first and second switches are connected between the first buffer counter and the recording medium interface, and between the second buffer counter and the recording medium interface, respectively, and are switched on/off by a predetermined control signal. The controller generates the control signal for switching on and off the first and second switches, respectively so as to provide the pulse generated at the end of every data write operation to the first buffer counter.

18 Claims, 3 Drawing Sheets

BUFFER ROOM LOGIC IN DATA STORAGE DEVICE AND METHOD FOR CONTROLLING THE SAME

BACKGROUND OF THE INVENTION

1. Technical Field

The present invention relates to a buffer room logic for buffering data transmitted between a data storage device and a host, and in particular, to a buffer room logic and a method for controlling the same so as to prevent the loss of write data which turns out to be flawed during data write verification in a buffer memory.

2. Related Art

Various data storage devices have emerged with the advent of the information era. There are two groups of data storage devices: one includes a hard disk drive and a floppy disk drive, using a magnetic disk as the recording medium; the other includes a compact disk-recordable (CD-R) and a compact disk-rewritable (CD-RW), using an optical disk as a recording medium. These data storage devices receive data from a host, record the received data in a recording medium, and repeatedly reproduce the data.

Among data recording devices, the hard disk drive is most widely used as an auxiliary memory device for a computer system. The hard disk drive receives data from a host upon input of a data write command from the host, and stores the data in an interior buffer memory. Then, the data stored in the buffer memory is recorded on a disk by moving a head to an intended position, that is, a target sector in a target track on the disk. The hard disk drive has a buffer memory of an appropriate size to reduce asynchronization between data transfer from the host and data transfer to the disk, and also has a register called a buffer counter for indicating how much data remains in the buffer memory. The hard disk drive also has logic for determining, according to the value of the buffer counter, whether the buffer memory has room for receiving data from the host, or data to be recorded on the disk. Host data transfer and disk data transfer are controlled according to the state of the logic. Generally, this logic is termed a buffer room logic, and includes a host room logic and a disk room logic.

As described in more detail below, the buffer room logic can be enabled or disabled, as necessary. If the host interface disables the buffer room logic, a host data transfer is performed regardless of the value stored in the buffer counter. If the disk interface disables the buffer room logic, a disk data transfer is performed regardless of the value stored in the buffer counter. In either case, the value stored in the buffer counter is not altered. That is to say, the buffer room logic can be enabled or disabled by the host interface and the disk interface.

Upon input of a data write command from the host, both the host interface and the disk interface enable the buffer room logic, and data transferred via the host interface and the disk interface is immediately recorded. Therefore, the value stored in the buffer counter is dynamically altered when all of the data is transferred from the host and recorded on the disk.

A problem arises in that the buffer room logic cannot always be enabled if a data write verification process is to be performed in order to re-read recorded data and determine whether the re-read data is defective. This is due to the fact that the data should be replaced by the next data in a given buffer memory in order to transfer a large amount of data from the host and record the data on a disk. In this case, recorded data is likely to be overwritten by data successively transferred from the host. Thus, since data which turns out to be flawed during a data write verification process should be written again, the data should remain in the buffer memory.

This problem can be solved by setting the value of a maximum buffer counter to a value smaller than the size of the buffer memory, and thus an amount of data is recorded and read up to the size of the buffer memory less the value stored in the maximum buffer counter (the latter value is the buffer memory margin). However, only after data is normally recorded is the next data recorded and, if the data fails, data reserved in the buffer memory is re-recorded. Thus, the method just described decreases the effect of buffer memory size since the value stored in the maximum buffer counter is set to a value smaller than the buffer memory size. Furthermore, when recording data from the buffer memory on a disk by means of a disk sequencer, only an amount of data up to the difference between the buffer memory size and the value stored in the maximum buffer counter is available. This causes an additional, remarkable drop in buffer performance.

Therefore, there is a need for the development of a buffer room logic and method for controlling the same which solves the above problem. That is to say, there is a need for the development of a buffer room logic and related method in which the value stored in the buffer counter is altered not during a data write but during a data read since the feature of a data write verification lies in recording next data only after recorded data is verified as normal. Furthermore, there is need for the development of a buffer room logic and related method in which, in order to prevent alteration of the value stored in the buffer counter during a data write process, the buffer room logic should be disabled by the disk interface. In other words, there is a need for the development of a buffer room logic and related method in which data transfer and alteration of the buffer counter contents should be separately controlled by enabling or disabling the buffer room logic in order to implement a data write verification process.

The following patent is considered to be representative of the prior art, and is burdened by the disadvantages set forth herein: U.S. Pat. No. 5,455,954 to Packer, entitled *Host Interrupt Signal Generation Circuit For Controlling An Auto Read Operation In A Disk Drive Controller.*

SUMMARY OF THE INVENTION

An object of the present invention is to provide a buffer room logic and a method for controlling the same so as to prevent failed recorded data from being lost by data successively transferred from a host during a data write verification in a buffer memory.

Another object of the present invention is to provide a buffer room logic and a method for controlling the same so as to rapidly transfer data to a data storage device with a data write verification capability within a range allowed by a buffer memory.

To achieve the above objects, there is provided a buffer room logic for buffering data transferred between a host and a data storage device with a data write verification capability, and for storing data on a predetermined recording medium. The buffer room logic has first and second buffer counters, first and second comparators, first and second switches, and a controller.

The first and second buffer counters count pulses generated at the end of a data transfer from a host interface, and at the end of a data write, respectively.

The first comparator compares the value of the first buffer counter with the value of a maximum buffer counter indicating a maximum size of a buffer memory, and outputs a pulse to the host interface so as to stop data transfer from the host if the comparison results in a host-no-room condition. The second comparator compares the value of the second buffer counter with the value of the maximum buffer counter, and outputs a pulse to a recording medium interface so as to stop transfer of data read from the recording medium if the comparison results in a disk-no-room condition.

The first and second switches are connected between the first buffer counter and the recording medium interface, and between the second buffer counter and the recording medium interface, respectively and are switched on/off by a predetermined control signal.

The controller generates a control signal for switching on and off the first and second switches, respectively so as to output a pulse generated at the end of every data write to the first buffer counter.

To achieve the above objects, there is also provided a method for controlling a buffer room logic having first and second buffer counters for varying the values thereof by a data transfer end pulse and a data write end pulse, first and second comparators for outputting a pulse for stopping data transfer from a host and a pulse for stopping data transfer from a disk, respectively, and first and second switches connected between the first buffer counter and a disk interface, and between the second buffer counter and the disk interface, respectively. In the buffer room logic controlling method, the second switch switches on to output the data write end pulse only to the second buffer counter upon input of a data write command. It is determined whether recorded data fails by reading the recorded data at every write of data in a data sector unit, and then data transfer from the host is controlled by switching on only the first switch when the recorded data turns out not to fail as a result of the determination.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
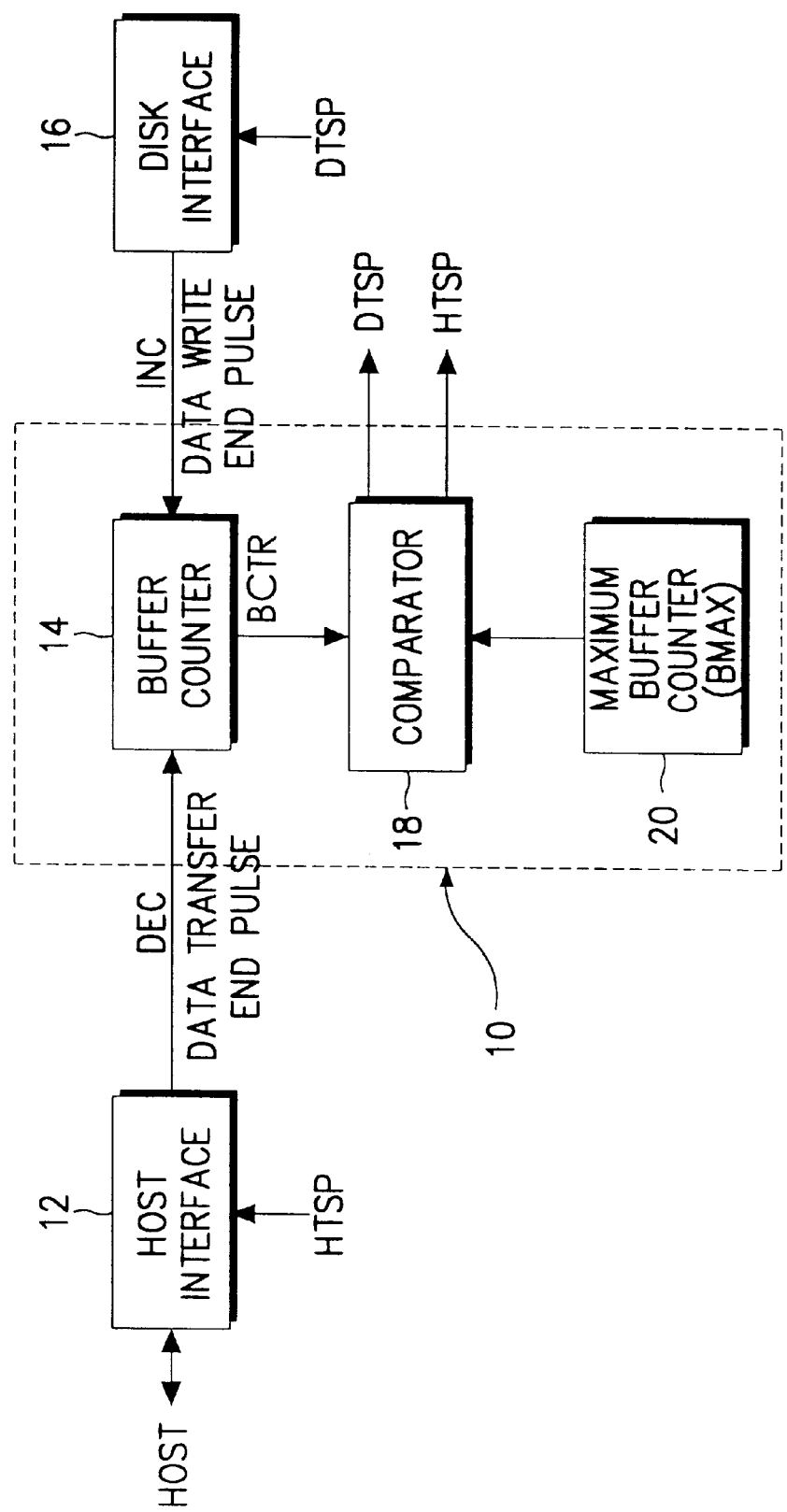
FIG. 1 is a block diagram of a buffer room logic in a hard disk controller of a hard disk drive.

FIG. 1 is a block diagram of a buffer room logic in a hard disk controller of a hard disk drive. In FIG. 1, a buffer room logic 10 has a buffer counter 14 which is a register indicating the size of the room available in a buffer memory for data transfer between a host interface 12 and a disk interface 16. The "size of room available in a buffer memory" indicates the size of room left in the buffer memory, expressed in terms of sector units. Hereinafter, the value of the buffer counter 14 will be referred to as BCTR. The value BCTR of the buffer counter 14 is decremented by one upon receipt of a data transfer end pulse from the host interface 12, while it is incremented by one upon receipt of a data write end pulse from the disk interface 16. The host interface 12 and the disk interface 16 stop data transfer upon receipt of their respective data transfer stop pulses HTSP (i.e., Host Transfer Stop Pulse) and DTSP (i.e., Disk Transfer Stop Pulse) from a comparator 18.

A maximum buffer counter 20 indicates the total number of buffer memory segments (hereinafter, referred to as buffer segments). Its value will be referred to as BMAX hereinbelow. The comparator 18 compares the value BCTR of the buffer counter 14 with the value BMAX of the maximum buffer counter 20. If the comparison results in a host-no-room condition, the comparator 18 outputs the host transfer stop pulse HTSP to the host interface 12. On the contrary, if the comparison results in a disk-no-room condition, the comparator 18 outputs the disk transfer stop pulse DTSP to the disk interface 16. The comparator 18 shown in FIG. 1 includes a first comparator for a host room logic and a second comparator for a disk room logic. The first and second comparators output the host transfer stop pulse HTSP and the disk transfer stop pulse DTSP, respectively, according to the result of the comparison between the values BCTR and BMAX.

The operation of the buffer room logic as constituted above will be described. For data write, an initial value BCTR of the buffer counter 14 is equal to the value BMAX of the maximum buffer counter 20 since all of the buffer segments are available for host data transfer. The value BCTR of the buffer counter 14 is decremented by one upon receipt of each data transfer in a data sector unit from the host interface 12, while it is incremented by one with each data transfer to the disk interface 16. Meanwhile, for data read, an initial value BCTR of the buffer counter 14 is zero since there is no data to be transferred to the host interface 12. BCTR of zero implies that data cannot be transferred from and to the host interface 12 during either of data read and data write. This state is called a host-no-room condition. On the contrary, when the value BCTR of the buffer counter 14 is equal to the value BMAX of the maximum buffer counter, data cannot be transferred from and to the disk interface 16. This state is called a disk-no-room condition. In the disk-no-room condition, data transfer to a disk comes to a halt by stopping a disk sequencer.

The buffer room logic 10 can be enabled or disabled, when necessary. If the host interface 12 disables the buffer room logic 10, a host data transfer is performed regardless of the value BCTR of the buffer counter 14. If the disk interface 16 disables the buffer room logic 10, a disk data transfer is performed regardless of the value BCTR of the buffer counter 14. In either case, the value BCTR of the buffer counter 14 is not altered. That is, buffer room logic 10 can be enabled or disabled by the host interface 12 and the disk interface 16. Upon input of a data write command from the host, both the host interface 12 and the disk interface 16 enable the buffer room logic 10, a target cylinder and sector and a corresponding head are searched for, and data transferred via the host interface 12 and the disk interface 16 is immediately recorded. Therefore, the value BCTR of the buffer counter is very dynamically altered, and becomes equal to its initial value, that is, the value BMAX of the maximum buffer counter 20, when all the data transferred from the host is recorded on the disk.

If the disk interface 16 performs only a write operation during a data write, it is convenient to keep the buffer room logic 10 enabled. However, the buffer room logic cannot always be enabled if a data write verification is to be performed to re-read recorded data and determine whether the re-read data is defective. This is because data should be replaced by next data in a given buffer memory in order to transfer a large amount of data from the host and record the data on a disk. Here, recorded data is likely to be overwritten by data successively transferred from the host. Therefore, since data which turns out to be flawed during a data write verification should be written again, the data should remain in the buffer memory.

To settle this problem, the value BMAX of the maximum buffer counter 20 is set to a value smaller than the size of a buffer memory, and an amount of data is recorded and read up to the size of the buffer memory lies the value BMAX, that is, the size of the buffer memory margin. Only after the data is normally recorded is the next data recorded. If the data fails, data reserved in the buffer memory is re-recorded. This method decreases the effective buffer memory size since the value BMAX of the maximum buffer counter 20 is set to a value smaller than the buffer memory size. Further, when recording data from the buffer memory on the disk by the disk sequencer, only an amount of up to data difference between the buffer memory size and the value BMAX of the maximum buffer counter 20 is available. Thus, a remarkable drop in buffer performance is experienced.

The above problem can be solved by altering the value BCTR of the buffer counter 14 not during a data write but during a data read, since the feature of a data write verification lies in recording next data only after recorded data is verified to be normal. To prevent the alteration of the value BCTR during the data write, the buffer room logic should be disabled by the disk interface 16. In other words, data transfer and BCTR alteration should be separately controlled by enabling or disabling the buffer room logic in order to implement a data write verification.

Figure 2:
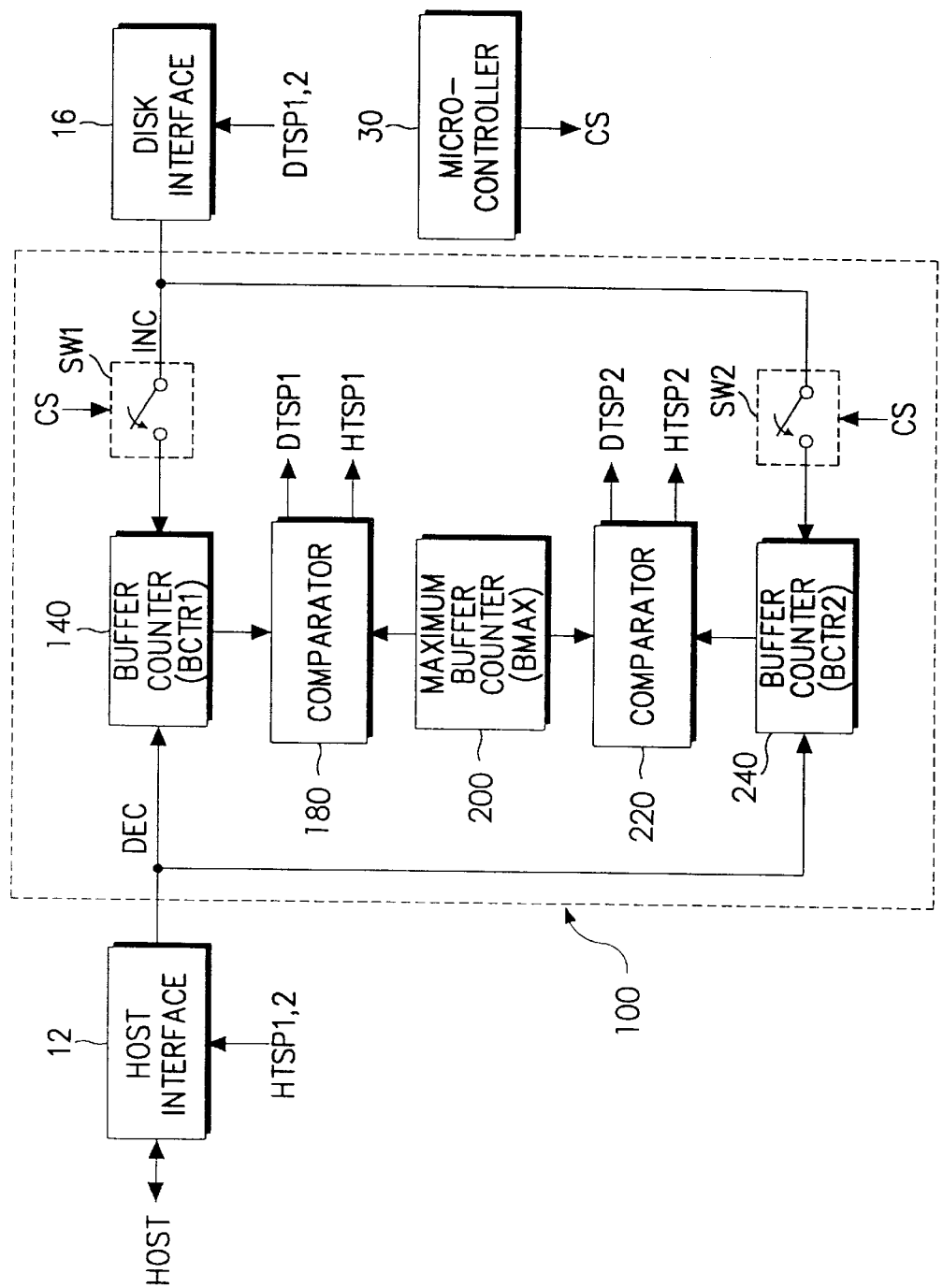
FIG. 2 is a block diagram of a buffer room logic according to an embodiment of the present invention.
Figure 3:
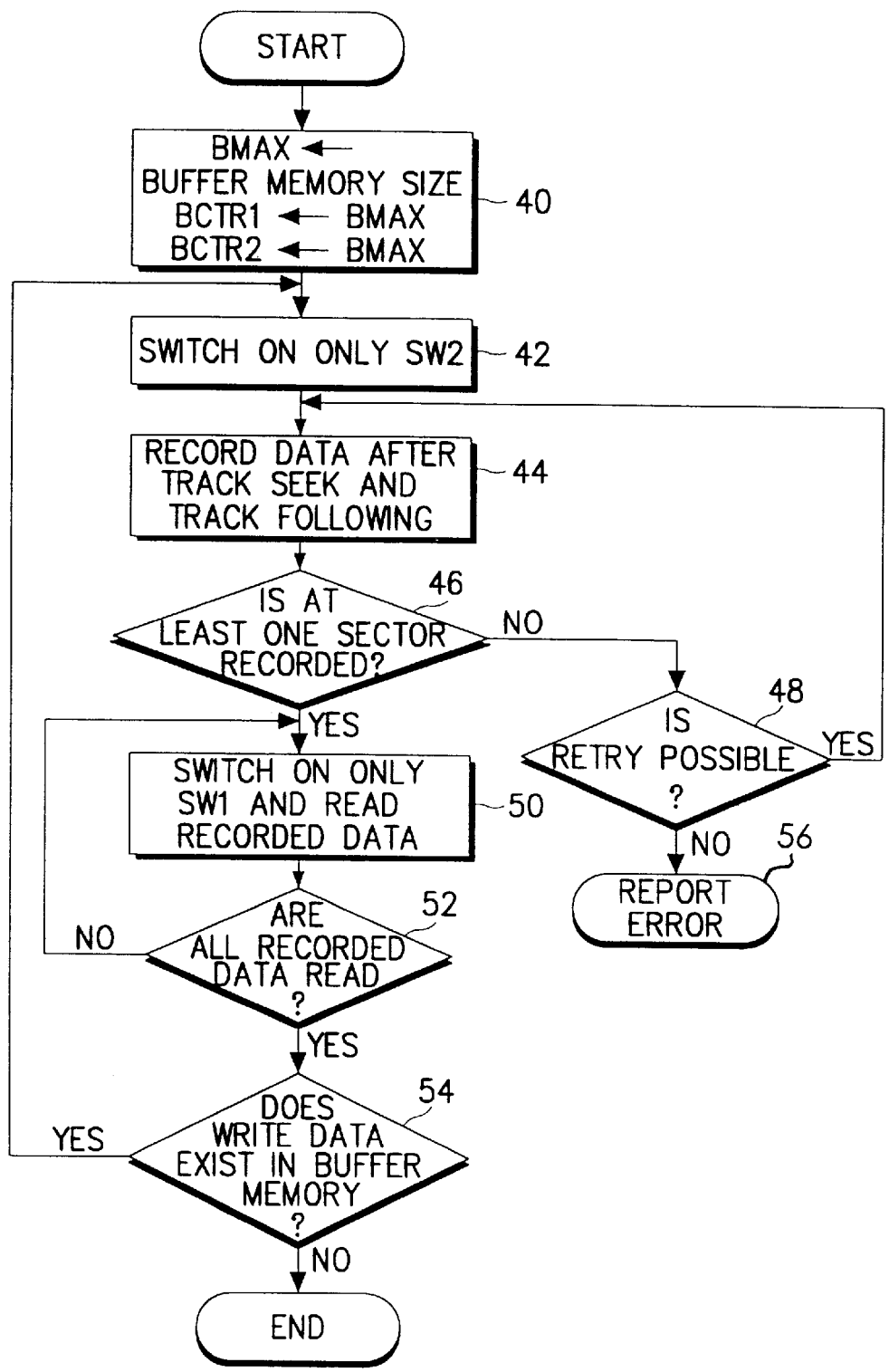
FIG. 3 is a flowchart of a data write verifying process according to an embodiment of the present invention.

FIG. 2 is a block diagram of buffer room logic according to an embodiment of the present invention, and FIG. 3 is a flowchart of a buffer room logic controlling the process during a data recording verification according to an embodiment of the present invention.

In FIG. 2, a buffer room logic 100 has two buffer counters 140 and 240, two comparators 180 and 220, two switches SW1 and SW2, and a maximum buffer counter 200. The values BCTR1 and BCTR2 of the buffer counters 140 and 240 are decremented by one by a data transfer end pulse DEC received from the host interface 12, while they are incremented by one by a data write end pulse INC received from the disk interface 16. The host interface 12 and the disk interface 16 stop data transfer upon input of their respective data transfer stop pulses HTSP1 and HTSP2, and DTSP1 and DTSP2 from the comparators 180 and 220, respectively. Each of the comparators 180 and 220 includes a first comparator for a host room logic and a second comparator for a disk room logic, as described above referring to FIG. 1. The maximum buffer counter 200 is a buffer memory segment register, and its value BMAX is set according to the size of a buffer memory. The comparator 180 compares the value BCTR1 of the buffer counter 140 with the value BMAX of the maximum buffer counter 200, and outputs the data transfer stop pulses DTSP1 and HTSP1 to the host interface 12 and disk interface 16, respectively, whereas the comparator 220 compares the value BCTR2 of the buffer counter 240 with the value BMAX of the maximum buffer counter 200, and outputs the data transfer stop pulses DTSP2 and HTSP2 to the host interface 12 and disk interface 16, respectively. The switch SW1 connected between the buffer counter 140 and the disk interface 16 is switched on or off by a control signal CS output from a microcontroller 30 having a memory provided with a control program according to the embodiment of the present invention. The switch SW2 connected between the buffer counter 240 and the disk interface 16 is switched on or off by the control signal CS output from the microcontroller 30.

The control operation of the buffer room logic 10 during a data write verification operation will be described with reference to FIG. 3.

Upon input of a data write command from a host, the microcontroller 30 sets the values BCTR1 and BCTR2 of the buffer counters 140 and 240, respectively, to the value BMAX of the maximum buffer counter 200, in step 40. The value BMAX of the maximum buffer counter 200 is the size of the buffer memory. In step 42, the microcontroller 30 switches on only the switch SW2. Thus, although both values BCTR1 and BCTR2 are decremented by one by a data transfer end pulse, only the value BCTR2 is incremented by a data write end pulse during a data transfer to the disk interface 16. Therefore, as long as the value BCTR1 is not incremented by the data recording end pulse, data is not transferred successively from the host because the comparator 180 outputs the host transfer stop pulse HTSP1 to the host interface 12 in a host-no-room condition. Therefore, recorded data which proves to be a failure during the data write verification is not overwritten by newly transferred data. On the other hand, the comparator 220 compares the value BCTR2 of the buffer counter 240 with the value BMAX of the maximum buffer counter 200, and outputs only the disk transfer stop pulse DTSP2 to the disk interface 16 when the comparison results in a disk-no-room condition. That is, the host interface 12 stops data transfer to the host by the host transfer stop pulse HTSP1, and the disk interface 16 stops a disk sequencer by means of the disk transfer stop pulse DTSP2.

Then, the microcontroller 30 performs track seek and track following operations so as to move a head to a target track and a target sector, and then runs the disk sequencer to record data, in step 44. In step 46, the microcontroller 30 determines whether at least one sector is recorded during a data write operation. If data is not recorded in at least one sector, the microcontroller 30 determines whether it is possible to retry data recording in step 48. If it is impossible to retry data recording, the microcontroller 30 reports a data write error to the host in step 56. If it is possible to retry data recording, steps 44 and 46 are repeated. If data is recorded in at least one sector, the microcontroller 30 switches on only the switch SW1 to increment only the value BCTR1 by means of the data write end pulse, and reads recorded data, in step 50. That is, the microcontroller 30 disables the disk room logic to operate the disk sequencer, regardless of the values DTSP1 and DTSP2, so as to read the data. The data write end pulse, generated with every data transfer in a data sector unit, increments the value BCTR1 via the switch SW1, thus making the values BCTR1 and BCTR2 equal. In step 52, the microcontroller 30 determines whether all the recorded data is normally read. If the data is not normally read, a return to step 50 is executed. If the data is normally read, the microcontroller 30 determines whether write data remains in the buffer memory, in step 54. If the write data remains in the buffer memory, the microcontroller 30 returns to step 42, and sequentially performs a series of steps as described above, so that all the data transferred from the host is recorded on the disk and read again for data write verification. If the write data does not remain in the buffer memory, the process is ended.

In the process of controlling the buffer room logic for data write verification, the values BCTR1 and BCTR2 of the buffer counters 14 and 22, respectively, are decremented by the data transfer end pulse generated with every data transfer of a data sector unit from the host, and only the value BCTR2 is incremented after the data is recorded on the disk. After the data write verification, only the value BCTR1 is incremented by the data write end pulse generated with a data write in a data sector unit. Thus, recorded data which turns out to be a failure during the data write verification is prevented from being overwritten by data successively transferred from the host.

As described above, the buffer room logic for buffering data transferred between a data storage device and a host according to the present invention can prevent defective recorded data from being lost by data successively transferred from the host during a data write verification. Furthermore, since data can be rapidly recorded within a range allowed by a buffer memory, drive performance can be increased.

Although a hard disk drive has been described as the data storage device in the embodiment of the present invention, it is merely exemplary in nature. Therefore, the present invention can be applied as a buffer room logic in any data storage device for transferring data from and to a host, such as a CD-R drive or a CD-R/W drive, without any particular modification.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A buffer room logic for buffering data transferred between a host and a data storage device with a data write verification capability so as to store data on a predetermined recording medium, comprising:

first and second buffer counters for counting pulses generated at the end of a data transfer from a host interface and at the end of a data write;

first comparator means for comparing the value of the first buffer counter with the value of a maximum buffer counter indicating a maximum size of a buffer memory, and for outputting a pulse to the host interface so as to stop data transfer from the host when the comparison results in a host-no-room condition;

second comparator means for comparing the value of the second buffer counter with the value of the maximum buffer counter, and for outputting a pulse to a recording medium interface so as to stop transfer of data read from the recording medium when the comparison results in a disk-no-room condition;

first and second switches connected between the first buffer counter and the recording medium interface, and between the second buffer counter and the recording medium interface, respectively, said first and second switches being switched on and off by a predetermined control signal; and controller means for generating the predetermined control signal for switching on and off the first and second switches, respectively;

wherein said controller means switches on the second switch and switches off the first switch in response to a data write command from the host, whereby the second counter counts in response to each data write to the predetermined recording medium; and wherein said controller means switches on the first switch and switches off the second switch in response to each recording of data in at least one sector of the predetermined recording medium.

2. A method for controlling a buffer room logic having first and second buffer counters for varying the values thereof by means of a data transfer end pulse and a data write end pulse, first and second comparators for outputting a pulse for stopping data transfer from a host and a pulse for stopping data transfer from a disk, respectively, and first and second switches connected between the first buffer counter and a disk interface, and between the second buffer counter and the disk interface, respectively, the method comprising the steps of:

switching on the second switch and switching off the first switch upon input of a data write command so as to output the data write end pulse only to the second buffer counter;

determining whether the writing of data fails by reading recorded data at every writing of data in a data sector unit; and controlling data transfer by switching on the first switch and switching off the second switch when the determining step determines that the recorded data does not fail.

3. A buffer room logic for buffering data transferred between a host and a data storage device with a data write verification capability so as to store data on a predetermined recording medium, comprising:

first buffer counter means for counting a pulse generated at the end of a data transfer from a host interface, and for counting a pulse generated by a data storage device interface at the end of each successful recording of data on the predetermined recording medium;

second buffer counter means for counting the pulse generated at the end of the data transfer from the host interface, and for counting a pulse generated by the data storage device interface at the end of a data write to the predetermined recording medium;

maximum buffer counter means for indicating a maximum size of a buffer memory;

first comparator means for comparing a value of the first buffer counter means with a value of the maximum buffer counter means, and for outputting a pulse to stop data transfer from the host when the comparing results in a host-no-room condition;

second comparator means for comparing a value of the second buffer counter means with the value of the maximum buffer counter means, and for outputting a pulse so as to stop transfer of data read from the predetermined recording medium when the comparing results in a disk-no-room condition; and controller means for selectively opening a first path between said first buffer counter means and the predetermined recording medium at the end of each successful recording of the data on the data storage device, and for selectively opening a second path between the second buffer counter means and the predetermined recording medium at the end of the data transfer from the host interface to the buffer memory but prior to the successfil recording of the data on the predetermined recording medium.

4. The buffer room logic of claim 3, wherein said controller means comprises:

a first switch connected between said first buffer counter means and the predetermined recording medium;

a second switch connected between the second buffer counter means and the predetermined recording medium; and a controller for generating a predetermined control signal for selectively switching on and off the first and second switches, respectively, so as to open the first and second paths, respectively.

5. A method for buffering data transferred between a host and a data storage device with a data write verification capability so as to store data on a predetermined recording medium in the data storage device, said method comprising the steps of:

counting pulses generated at the end of a data transfer from a host interface, pulses generated at the end of a data write, and pulses generated at the end of a successful recording of data on the predetermined recording medium;

comparing a value counted with a value of a maximum count indicating a maximum size of a buffer memory;

stopping data transfer from the host when a host-no-room condition exists;

stopping transfer of data read from the predetermined recording medium when a disk-no-room condition exists; and selectively opening and closing a path between first and second buffer counters, respectively, and the data storage device so as to output the pulses generated at the end of every data write operation to said second buffer counter, and to output the pulses generated at the end of every successful recording of data on the predetermined recording medium to the first buffer counter.

6. The method of claim 5, wherein said step of stopping data transfer from the host includes comparing a value of the first buffer counter with a value of a maximum buffer counter indicating the maximum size of the buffer memory, and outputting a pulse to the host in order to stop data transfer from the host when the host-no-room condition exists.

7. The method of claim 5, wherein said step of stopping transfer of data read from the predetermined recording medium comprises comparing a value of the second buffer counter with a value of a maximum buffer counter indicating the maximum size of the buffer memory, and outputting a pulse to the predetermined recording medium in order to stop transfer of data read from the predetermined recording medium when the disk-no-room condition exists.

8. A method for controlling a buffer room logic for buffering data transferred between a host and a data storage device, the method comprising the steps of:

providing first and second buffer counters for counting pulses generated at the end of a data transfer from the host, at the end of a data transfer to the data storage device, and at successful recording of data on the data storage device, respectively;

providing a maximum buffer counter indicating a maximum size of a buffer memory situated between the host and the data storage device;

setting values of the first and second buffer counters to a value of the maximum buffer counter;

establishing a path between the data storage device and the second buffer counter upon receipt of a data transfer from the host;

performing a track seek and track following operation to record data;

determining whether at least one sector of data is successfully recorded during a data write operation to the data storage device; and when at least one sector is successfully recorded, establishing a path between the data storage device and the first buffer counter.

9. The method of claim 8, further comprising the step of:

when at least one sector is not recorded, determining whether a retry is possible; and when a retry is possible, re-recording the data after said track seek and track following operation; and when said retry is not possible, reporting an error.

10. The method of claim 9, further comprising the step of:

determining whether all recorded data are read; and when all recorded data are not read, establishing said path between said data storage device and said first buffer counter, and reading the recorded data.

11. The method of claim 10, further comprising the step of:

when all recorded data are read, determining whether write data exists in the buffer memory; and when the write data does exist in the buffer memory, returning to the step of establishing said path between said data storage device and said second buffer counter.

12. The method of claim 11, further comprising the step of:

when write data does not exist in the buffer memory, ending the process.

13. The method of claim 8, further comprising the steps of:

determining whether all recorded data are read;

when all recorded data are read, determining whether write data exists in the buffer memory; and when the write data does exist in the buffer memory, returning to the step of establishing said path between said data storage device and said second buffer counter.

14. The method of claim 13, further comprising the step of:

when write data does not exist in the buffer memory, ending the process.

15. A buffer room logic for buffering data transferred between a host and a data storage device with a data write verification capability so as to store data on a predetermined recording medium, comprising:

first buffer counter means for counting a pulse generated at the end of a data transfer from a host interface, and for counting a pulse generated by a data storage device interface at the end of each successful recording of data on the predetermined recording medium;

second buffer counter means for counting the pulse generated at the end of the data transfer from the host interface, and for counting a pulse generated by the data storage device interface at the end of a data write to the predetermined recording medium; and controller means for selectively opening a first path between said first buffer counter means and the predetermined recording medium at the end of each successful recording of the data on the data storage device, and for selectively opening a second path between the second buffer counter means and the at the end of the data transfer from the host interface to the buffer memory but prior to the successful recording of the data on the predetermined recording medium.

16. The buffer room logic of claim 15, further comprising maximum buffer counter means for indicating a maximum size of a buffer memory.

17. The buffer room logic of claim 16, further comprising comparator means for comparing a value of the first buffer counter means with a value of the maximum buffer counter means, and for outputting a pulse to stop data transfer from the host when the comparing results in a host-no-room condition.

18. The buffer room logic of claim 16, further comprising comparator means for comparing a value of the second buffer counter means with a value of the maximum buffer counter means, and for outputting a pulse so as to stop transfer of data read from the predetermined recording medium when the comparing results in a disk-no-room condition.

* * * * *